(12) United States Patent
Akkapeddi

(10) Patent No.: US 11,573,937 B2
(45) Date of Patent: Feb. 7, 2023

(54) SYSTEM AND METHOD FOR AUTOMATICALLY RESOLVING METADATA STRUCTURE DISCREPANCIES

(71) Applicant: BANK OF AMERICA CORPORATION, Charlotte, NC (US)

(72) Inventor: Naga Vamsi Krishna Akkapeddi, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 92 days.

(21) Appl. No.: 17/067,130

(22) Filed: Oct. 9, 2020

(65) Prior Publication Data
US 2022/0114149 A1  Apr. 14, 2022

(51) Int. Cl.
G06F 16/00 (2019.01)
G06F 16/21 (2019.01)
G06F 16/22 (2019.01)
G06N 20/00 (2019.01)
G06F 9/46 (2006.01)

(52) U.S. Cl.
CPC ........ *G06F 16/213* (2019.01); *G06F 16/2282* (2019.01); *G06F 9/466* (2013.01); *G06N 20/00* (2019.01)

(58) Field of Classification Search
CPC .... G06F 16/213; G06F 16/2282; G06F 9/466; G06N 20/00
USPC .................................................. 707/600-899
See application file for complete search history.

(56) References Cited

U.S. PATENT DOCUMENTS

| | | | |
|---|---|---|---|
| 6,418,448 B1 | 7/2002 | Sarkar | |
| 7,162,473 B2 | 1/2007 | Dumais et al. | |
| 7,272,592 B2 | 9/2007 | Wyatt et al. | |
| 7,480,654 B2 | 1/2009 | Jujjuri et al. | |
| 7,519,593 B2 | 4/2009 | Abe et al. | |
| 7,617,257 B2 | 11/2009 | Sathyanarayan et al. | |
| 7,657,581 B2 | 2/2010 | Orenstein et al. | |
| 7,743,037 B2 | 6/2010 | Ando et al. | |
| 7,885,921 B2 | 2/2011 | Mahar et al. | |
| 7,941,709 B1 * | 5/2011 | Hong | G06F 16/13 714/54 |
| 8,140,785 B2 | 3/2012 | Kalos et al. | |
| 8,219,556 B2 | 7/2012 | Irie et al. | |
| 8,244,700 B2 | 8/2012 | Permandla et al. | |

(Continued)

*Primary Examiner* — Michelle N Owyang

(57) ABSTRACT

A system includes first and second subsystems and a third processor. The first subsystem includes a first memory and a first processor. The first memory stores data, which includes metadata associated with transmitted metadata fields. The first processor transmits the data to the second subsystem. The second subsystem includes a second memory and a second processor. The second memory stores expected metadata fields. The second processor receives the data. The third processor determines that the first subsystem transmitted the data to the second subsystem and that a mismatch exists between the transmitted and expected metadata fields. In response, the third processor prevents the second subsystem from executing an application configured to process the data using the expected metadata fields. The third processor resolves the mismatch by modifying the expected metadata fields such that they correspond to the transmitted metadata fields and allows the second subsystem to execute the application.

20 Claims, 4 Drawing Sheets

(56) References Cited

U.S. PATENT DOCUMENTS

| | | | |
|---|---|---|---|
| 8,375,007 B2 * | 2/2013 | Brodie | G06F 16/48 |
| | | | 707/690 |
| 8,375,008 B1 | 2/2013 | Gomes | |
| 8,527,606 B2 | 9/2013 | Yamagishi et al. | |
| 8,726,267 B2 | 5/2014 | Li et al. | |
| 8,935,211 B2 | 1/2015 | Orenstein et al. | |
| 9,020,987 B1 | 4/2015 | Nanda et al. | |
| 9,047,344 B2 | 6/2015 | Brannon et al. | |
| 9,361,187 B2 | 6/2016 | Jarvis | |
| 9,405,473 B2 | 8/2016 | Zheng et al. | |
| 9,442,993 B2 | 9/2016 | Tung et al. | |
| 9,588,895 B2 | 3/2017 | Salyers et al. | |
| 9,715,519 B2 | 7/2017 | Atkisson | |
| 9,736,185 B1 | 8/2017 | Belamaric et al. | |
| 9,781,577 B2 | 10/2017 | Stephens et al. | |
| 9,805,056 B2 | 10/2017 | Parkison et al. | |
| 9,965,358 B2 | 5/2018 | Chowdhry | |
| 9,979,691 B2 | 5/2018 | Lord | |
| 10,073,875 B2 | 9/2018 | Larson | |
| 10,387,449 B2 | 8/2019 | Isherwood et al. | |
| 10,599,637 B2 | 3/2020 | Marcotte | |
| 10,884,993 B1 * | 1/2021 | Grunwald | G06F 11/2064 |
| 2005/0234969 A1 | 10/2005 | Mamou et al. | |
| 2006/0190500 A1 | 8/2006 | Rao et al. | |
| 2012/0207088 A1 | 8/2012 | Liu et al. | |
| 2014/0074783 A1 | 3/2014 | Alsina et al. | |
| 2014/0244897 A1 | 8/2014 | Goss et al. | |
| 2016/0077744 A1 | 3/2016 | Pundir et al. | |
| 2016/0132396 A1 | 5/2016 | Kimmel et al. | |
| 2017/0235641 A1 * | 8/2017 | Ancel | G06F 11/1458 |
| | | | 707/654 |
| 2019/0279101 A1 | 9/2019 | Habti et al. | |
| 2019/0325259 A1 | 10/2019 | Murphy | |
| 2019/0327299 A1 * | 10/2019 | Diamanti | H04L 67/1095 |
| 2020/0034304 A1 | 1/2020 | Trika | |
| 2021/0224245 A1 * | 7/2021 | Sharma | G06N 20/00 |
| 2021/0232317 A1 * | 7/2021 | Kuramkote | G06F 3/0653 |

* cited by examiner

US 11,573,937 B2

SYSTEM AND METHOD FOR AUTOMATICALLY RESOLVING METADATA STRUCTURE DISCREPANCIES

TECHNICAL FIELD

The present disclosure relates generally to data structures, and more particularly, to a system and method for automatically resolving metadata structure discrepancies.

BACKGROUND

Metadata is structured data that describes and/or provides information about other data. Metadata is generally stored according to a set of metadata fields.

SUMMARY

Organizations often maintain multiple systems that they use to cooperatively process data. For example, an employee seeking reimbursement for expenses incurred during a business trip may submit a set of receipts to a first system. This first system may be used to assemble these receipts into a single invoice. The first system may then pass the invoice to a second system which is used to validate the charges appearing on the invoice. For example, the second system may remove charges which are inconsistent with the organization's reimbursement policy. The second system may then send the validated invoice to a third system which is used to process a payment to the employee based on the validated invoice. At each step of this process, in order to understand and properly process the incoming data, the system receiving the data should have knowledge of the metadata fields associated with the data.

Frequently, these metadata fields are hardcoded within the applications that are used by the individual systems to process the data. This works well, provided that at each system the metadata fields associated with the incoming data match the metadata fields hardcoded in the applications used to process that data. Issues may arise, however, if (1) an update occurs to a system that is used to generate output data, such that the metadata fields associated with the output data have changed, and (2) a corresponding update does not occur to a system that is used to process that output data. For example, consider the situation described above, in which a first system is used to assemble a set of receipts into a single invoice and a second system is used to validate the charges appearing in the invoice. This first system may originally be designed to generate an invoice that includes three columns: a first column to store the pre-tax cost of each change, a second column to store the total tax associated with each charge, and a third column to store the after-tax cost of each charge. The metadata associated with the invoice may accordingly include three fields, each of which is associated with one of the columns of the invoice. The second system may be hardcoded to use these metadata fields to identify the data stored in an invoice received from the first system. For example, the second system may use the hardcoded metadata fields to determine that data stored in the third column of the invoice corresponds to after-tax cost. The second system may apply a validation rule to the data stored in this third column such that the system will reject any after-tax costs greater than a specified threshold value. If, however, the first system is updated to generate invoices that include more than three columns, problems may arise. For example, the first system may be updated to generate invoices that include four columns: a first column to store the pre-tax cost of each change, a second column to store the state tax associated with each charge, a third column to store the federal tax associated with each charge, and a fourth column to store the after-tax cost of each charge. Because the second system is hardcoded with metadata fields that indicate that the third column of invoices received from the first system corresponds to the after-tax costs, the second system will attempt to validate that the after-tax costs are not greater than the specified threshold using the federal tax associated with each charge, rather than the actual after-tax cost. Accordingly, the presence of hardcoded metadata fields within the second system may lead to improperly validated invoices.

This disclosure contemplates a metadata discrepancy resolution tool configured to automatically identify and resolve metadata discrepancies such as the one described above. The metadata tool operates during the runtime of a system, which includes a set of subsystems, each of which is configured to receive data from one of the other subsystems, process the data, generate output data, and/or transmit the output data to a further subsystem. The metadata tool monitors the system and determines when a first subsystem has transmitted data to a second subsystem. In response to determining that the first subsystem has transmitted data to the second subsystem, the metadata tool next determines whether the metadata fields associated with the transmitted data match the metadata fields expected by the second subsystem. If the metadata tool determines that the received metadata fields do not match the expected metadata fields, the tool prevents the second subsystem from processing the received data. The tool then implements a machine learning algorithm to resolve the discrepancy. Once the discrepancy has been resolved, the tool allows the second subsystem to process the received data. An embodiment of the tool is described below.

According to an embodiment, a system includes a first subsystem and a second subsystem. The first subsystem includes a first memory and a first hardware processor communicatively coupled to the first memory. The first memory stores a set of first data. The set of first data includes a set of elements of first metadata associated with a set of first metadata fields. Each element of first metadata of the set of elements of first metadata is stored in a first metadata field of the set of first metadata fields. The first hardware processor transmits the set of first data to the second subsystem. The second subsystem includes a second memory and a second hardware processor communicatively coupled to the second memory. The second memory stores a set of expected metadata fields. The second hardware processor receives the set of first data.

The system also includes a third hardware processor. The third hardware processor determines that the first subsystem transmitted the set of first data to the second subsystem. The third processor also determines that a mismatch exists between the set of first metadata fields and the set of expected metadata fields. The mismatch includes at least one of a metadata field of the set of first metadata fields is missing from the set of expected metadata fields, and a metadata field of the set of expected metadata fields is missing from the set of first metadata fields. In response to determining that the mismatch exists, the third processor prevents the second subsystem from executing an application configured to process the set of first data using the set of expected metadata fields. The third processor additionally resolves the mismatch by modifying the set of expected metadata fields such that the set of expected metadata fields corresponds to the set of first metadata fields. The third processor further allows the second subsystem to execute the application.

Certain embodiments provide one or more technical advantages. As an example, an embodiment automatically resolves metadata discrepancies at subsystems that are configured to receive and process data. In particular, the embodiment resolves discrepancies between the metadata formats expected by the subsystems and the actual metadata formats received by the subsystems. As another example, an embodiment conserves processing resources by automatically preventing a subsystem from processing data for which the associated metadata format is not what is expected by the subsystem. This prevents a waste of the processing resources that would be associated with improperly processing the data as if it had the expected metadata format, and then subsequently reprocessing the data once the metadata discrepancy has been resolved. As a further example, an embodiment uses a machine learning algorithm to modify the source code of an application stored in the memory of a subsystem by not only altering the metadata format that is expected for input data received by the application, but also altering any mappings between the metadata format that is expected for the input data and the metadata format of any output data generated by the application.

The system described in the present disclosure may particularly be integrated into a practical application of a tool that provides a fail-safe for a set of subsystems that are used to collectively process data. The tool may be used to guard against errors that may be caused when: (1) application developers modify the metadata fields of the output data generated by a first subsystem, without considering the impact of this change on the remaining subsystems; (2) application developers inadvertently hardcode expected metadata fields into an application, while at the same time assuming that the application has been developed to dynamically obtain the expected metadata fields from, for example, a central metadata repository; and/or (3) any other situation that may lead to a mismatch between the metadata fields associated with a set of incoming data and the metadata fields expected for that data.

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages may be understood by referring to FIGS. 1 through 4 of the drawings, like numerals being used for like and corresponding parts of the various drawings.

I. System Overview

Figure 1:
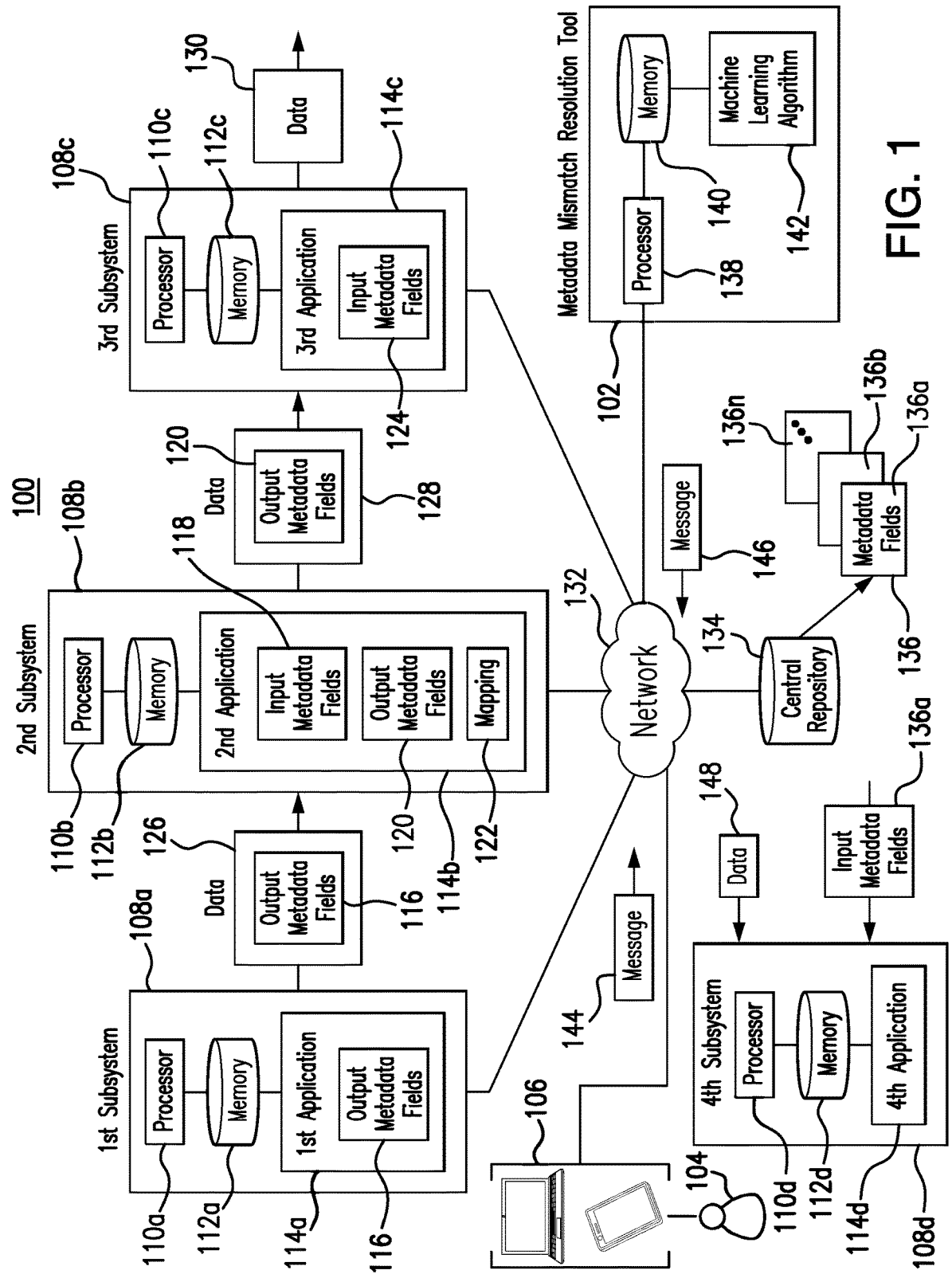
FIG. 1 illustrates an example metadata discrepancy resolution system.

FIG. 1 illustrates an example metadata discrepancy resolution system 100 that includes metadata tool 102, user(s) 104, device(s) 106, subsystems 108a through 108d, network 132, and central repository 134. Generally, metadata tool 102: (1) determines that first subsystem 108a transmitted output data 126 to second subsystem 108b, (2) determines that a discrepancy exists between the metadata fields 116 of data 126 and the metadata fields 118 expected by second subsystem 108b, (3) in response to identifying the discrepancy, prevents second subsystem 108b from processing data 126, (4) resolves the metadata discrepancy, and (5) allows second subsystem 108b to process data 126. The manner by which metadata tool 102 performs such tasks will be described in further detail below, in the discussion of FIGS. 2 through 4.

Devices 106 are used by users 104 located on network 132 to communicate with metadata tool 102 and/or subsystems 108a through 108d. As an example, in certain embodiments, user 104 may use device 106 to transmit a message 144 to at least one of first subsystem 108a, second subsystem 108b, third subsystem 108c, and fourth subsystem 108d, instructing the subsystem to execute an application 114 stored in the memory 112 of the subsystem. As another example, in certain embodiments, user 104 may use device 106 to transmit data 144 to at least one of first subsystem 108a, second subsystem 108b, third subsystem 108c, and fourth subsystem 108d, for use by an application 114 installed on the subsystem. As another example, in certain embodiments, user 104 may use device 106 to receive a message 146 from metadata tool 102, notifying user 104 that metadata tool 102 prevented second subsystem 108b from executing second application 114b to process data 126 received from first subsystem 108a due to a mismatch between the metadata fields 116 of data 126 and the metadata fields 118 expected by second subsystem 108b. As a further example, in certain embodiments, user 104 may use device 106 to receive a message 146 from metadata tool 102, notifying user 104 that the tool has resolved a metadata discrepancy.

Devices 106 include any appropriate device for communicating with components of system 100 over network 132. For example, devices 106 may be a telephone, a mobile phone, a computer, a laptop, a wireless or cellular telephone, a tablet, a server, and IoT device, and/or an automated assistant, among others. This disclosure contemplates devices 106 being any appropriate device for sending and receiving communications over network 108. Device 106 may also include a user interface, such as a display, a microphone, keypad, or other appropriate terminal equipment usable by user 104. In some embodiments, an application executed by a processor of device 106 may perform the functions described herein.

Subsystems 108a through 108d include any systems capable of receiving input data, processing the input data, generating output data, and/or transmitting output data. For example, as illustrated in FIG. 1, first subsystem 108a is a system configured to transmit output data 126 to second subsystem 108b; second subsystem 108b is a system configured to receive output data 126, process data 126, generate its own output data 128, and transmit output data 128 to third subsystem 108c; third subsystem 108c is a system configured to receive output data 128, process data 128, and generate its own output data 130; and fourth subsystem 108d is a system configured to receive and process data 148 received from any of subsystems 108a through 108c, device 106, or any other suitable source. In certain embodiments, subsystems 108a through 108d include applications 114a through 114d configured to perform these functions. For example, first subsystem 108a includes application 114a, second subsystem 108b includes application 114b, third subsystem 108c includes application 114c, and fourth subsystem 108d includes application 114d. Application 114a is configured to generate output data 126 and transmit output data 126 to second subsystem 108b. Application 114b is configured to receive output data 126 from first subsystem 108a, process data 126, generate output data 128, and transmit output data 128 to third subsystem 108c. Application 114c is configured to receive output data 128 from second subsystem 108b, process data 128, and generate output data 130. Application 114d is configured to receive and process data 148 received from any of subsystems 108a through 108c, device 106, or any other suitable source. While illustrated in FIG. 1 as including four subsystems 108a through 108d, system 100 may include any number of subsystems 108. Additionally, while illustrated in FIG. 1 as being separate from one another and each having its own processor 110 and memory 112, this disclosure contemplates that two or more subsystems 108a through 108d may correspond to the same processor 110 and memory 112. For example, subsystems 108a through 108d may correspond to applications 114a through 114d installed on a single subsystem 108.

Data 126/128/130/148 may be any type of data. For example, data 126/128/130/148 may include an image, a video, an audio file, a spreadsheet, a text file, a source code file, a binary file, an HTML file, a combination of the preceding, or any other suitable form of data. Output data 126/128/130/148 may include a set of metadata. For example, output data 126 includes metadata that is formatted according to metadata fields 116, and output data 128 includes metadata that is formatted according to metadata fields 120. Example metadata fields are presented below, in the discussion of FIGS. 2A and 2B.

In certain embodiments, one or more subsystems 108 store a set of expected metadata fields. For example, as illustrated in FIG. 1, in certain embodiments, subsystems 108b and 108c each store a set of expected metadata fields. For example, second subsystem 108b stores input metadata fields 118 in memory 112b and third subsystem 108c stores input metadata fields 124 in memory 112c. Input metadata fields 118 correspond to the metadata fields according to which second subsystem 108b expects the metadata of input data 126 to be stored. Similarly, input metadata fields 124 correspond to the metadata fields according to which third subsystem 108c expects the metadata of input data 128 to be stored. In some embodiments, one or more subsystems 108 do not store a set of expected metadata fields, and rather obtain the set of expected metadata fields from an external source. For example, as illustrated in FIG. 1, in certain embodiments, subsystem 108d does not store a set of expected metadata fields, but rather obtains input metadata fields 136a from central repository 134. In certain embodiments, subsystem 108d obtains input metadata fields 136a from central repository 134 in response to receiving input data 148. For example, in response to receiving input data 148, subsystem 108d may access central repository 134, search central repository 134 to find input metadata fields 136a (which correspond to the metadata fields according to which the metadata of input data 148 is stored), copy input metadata fields 136a into memory 112d, and use input metadata fields 136a to process input data 148.

Processors 110a through 110d of subsystems 108a through 108d are any electronic circuitry, including, but not limited to central processing units (CPUs), graphics processing units (GPUs), microprocessors, application specific integrated circuits (ASIC), application specific instruction set processor (ASIP), and/or state machines, that communicatively couple to memories 112a through 112d and control the operations of subsystems 108a through 108d. Processors 110a through 110d may be 8-bit, 16-bit, 32-bit, 64-bit or of any other suitable architecture. Processors 110a through 110d may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processors 110a through 110d may include other hardware and software that operates to control and process information. Processors 110a and 110d execute software stored on memory to perform any of the functions described herein. Processors 110a through 110d each control the operation and administration of their corresponding subsystem 108a through 108d by processing information received from device(s) 106, any of the other subsystems 108a through 108d, network 132, central repository 134, and/or corresponding memory of memories 112a through 112d. Processors 110a through 110d may be programmable logic devices, microcontrollers, microprocessors, any suitable processing devices, or any suitable combination of the preceding. Processors 110a through 110d are not limited to single processing devices and may encompass multiple processing devices.

Memories 112a through 112d of subsystems 108a through 108d may store, either permanently or temporarily, data, operational software, or other information for the corresponding processor 110a through 110d. Memories 112a through 112d may include any one or a combination of volatile or non-volatile local or remote devices suitable for storing information. For example, memories 112a through 112d may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in each of memories 112a through 112d, a disk, a CD, or a flash drive. In particular embodiments, the software may include an application executable by the corresponding processor 110a through 110d to perform one or more of the functions described herein.

In certain embodiments, memories 112a through 112d of subsystems 108a through 108d also store computer readable instructions in the form of one or more applications 114. For example, memory 112a of first subsystem 108a may store computer readable instructions corresponding to first application 114a, memory 112b of second subsystem 108b may store computer readable instructions corresponding to second application 114b, memory 112c of third subsystem 108c may store computer readable instructions corresponding to third application 114c, and memory 112d of fourth subsystem 108d may store computer readable instructions corresponding to fourth application 114d. Applications 114a through 114d may be any applications configured, when executed by processors 110, to receive input data, process input data, generate output data, and/or transmit output data.

As an example, first application 114a is configured, when executed by processor 110a, to generate output data 126 and transmit output data 126 to second subsystem 108b. As another example, second application 114b is configured, when executed by processor 110b, to receive output data 126 from first subsystem 108a, process data 126 to generate its own output data 128, and transmit output data 128 to third subsystem 108c. As another example, third application 114c is configured, when executed by processor 110c, to receive output data 128 from second subsystem 108b and process data 128 to generate its own output data 130. As a further example, fourth application 114d is configured, when executed by processor 110d, to receive and process data 148 received from any of subsystems 108a through 108c, device 106, or any other suitable source.

Network 132 facilitates communication between and amongst the various components of system 100. This disclosure contemplates network 132 being any suitable network operable to facilitate communication between such components. Network 132 may include any interconnecting system capable of transmitting audio, video, signals, data, messages, or any combination of the preceding. Network 132 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Central repository 134 is a database or other storage system configured to store sets of metadata fields 136a through 136n. Each set of metadata fields 136a through 136n is associated with input/output data and corresponds to the metadata fields according to which the metadata of that input/output data is stored. For example, the set of metadata fields 136a may be associated with input data 148 and correspond to the metadata fields according to which the metadata of input data 148 is stored. Central repository 134 may store sets of metadata fields 136a through 136n for use by any of subsystems 108a through 108d of system 100. In certain embodiments, central repository may also store sets of metadata fields 136a through 136n for one or more other systems, external to system 100.

Central repository 134 may store sets of metadata fields 136a through 136n in any suitable manner. For example, in certain embodiments, central repository 134 may store each set of metadata fields 136a through 136n according to the source of the data associated with the set of metadata fields and/or the destination of the data associated with the set of metadata fields. For instance, central repository 134 may store one or more relational tables linking sets of metadata fields 136a through 136n to the subsystems 108 used to generate the data associated with the metadata fields and/or the subsystems 108 that process the data associated with the metadata fields. As a specific example, central repository 134 may store a relational table linking fourth subsystem 108d to set of metadata fields 136a, indicating that fourth system 108 is configured to process data 148 that includes metadata stored according to metadata fields 136a. Accordingly, when fourth subsystem 108d receives input data 148, it may access central repository 134 through which it may identify set of metadata fields 136a and copy set of metadata fields 136a for use in processing input data 148. In certain embodiments, central repository 134 may store multiple versions of one or more sets of metadata fields 136a through 136n. For example, central repository 134 may store a first version of metadata fields 136a associated with a first version of data 148 and a second version of metadata fields 136a associated with a second version of data 148. In some embodiments, central repository 134 uses a version control system to manage different versions of sets of metadata fields 136a through 136n.

As seen in FIG. 1, metadata tool 102 includes a processor 138 and a memory 140. This disclosure contemplates processor 138 and memory 140 being configured to perform any of the functions of metadata tool 102 described herein. Generally, metadata tool 102 monitors communications between any of subsystems 108a through 108d. In response to determining that a first subsystem 108a transmitted data 126 to a second subsystem 108b, metadata tool 102 determines whether the set of metadata fields 116 associated with data 126 matches the set of metadata fields 118 expected by second subsystem 108b. If a discrepancy exists, metadata tool 102 prevents second subsystem 108b from processing data 126. Metadata tool 102 then uses machine learning algorithm 142 to resolve the discrepancy. After resolving the discrepancy, metadata tool 102 allows second subsystem 108b to process data 126. The manner by which metadata tool 102 accomplishes these functions is described in further detail below, in the discussion of FIGS. 3 and 4.

Processor 138 is any electronic circuitry, including, but not limited to central processing units (CPUs), graphics processing units (GPUs), microprocessors, application specific integrated circuits (ASIC), application specific instruction set processor (ASIP), and/or state machines, that communicatively couples to memory 140 and controls the operation of metadata tool 102. Processor 138 may be 8-bit, 16-bit, 32-bit, 64-bit or of any other suitable architecture. Processor 138 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 138 may include other hardware and software that operates to control and process information. Processor 138 executes software stored on memory to perform any of the functions described herein. Processor 138 controls the operation and administration of metadata tool 102 by processing information received from device(s) 106, subsystems 108a through 108d, network 132, central repository 134, and/or memory 140. Processor 138 may be a programmable logic device, a microcontroller, a microprocessor, any suitable processing device, or any suitable combination of the preceding. Processor 138 is not limited to a single processing device and may encompass multiple processing devices.

Memory 140 may store, either permanently or temporarily, data, operational software, or other information for processor 138. Memory 140 may include any one or a combination of volatile or non-volatile local or remote devices suitable for storing information. For example, memory 140 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 140, a disk, a CD, or a flash drive. In particular embodiments, the software may include an application executable by processor 138 to perform one or more of the functions described herein.

In certain embodiments, memory 140 stores machine learning algorithm 142. Machine learning algorithm 142 is a set of computer readable instructions that may be executed by processor 138 to perform certain functions. For example, in certain embodiments, machine learning algorithm 142 is configured, when executed by processor 138, to determine that a discrepancy exists between (a) metadata fields 118 expected by second subsystem 108*b* for data 126 received from first subsystem 108*a* and (b) the actual metadata fields 116 of data 126. As another example, in certain embodiments, machine learning algorithm 142 is configured, when executed by processor 138, to resolve any identified discrepancies between expected metadata fields 118 and actual metadata fields 116. Machine learning algorithm 142 may be configured to resolve a discrepancy between the metadata fields 118 expected for data 126 and the metadata fields 116 received for data 126 in any suitable manner. As an example, in certain embodiments, in response to determining that the set of received metadata fields 116 includes one or more extra metadata fields that are not present in the set of expected metadata fields 118, machine learning algorithm 142 is configured to add these extra metadata fields to the set of expected metadata fields 118. As another example, in certain embodiments, in response to determining that the set of received metadata fields 116 is missing one or more metadata fields that are present in the set of expected metadata fields 118, machine learning algorithm 142 is configured to remove these missing metadata fields from the set of expected metadata fields 118. As a further example, in certain embodiments second subsystem 108*b* stores a mapping 122 between the set of expected metadata fields 118 and a set of output metadata fields 120 associated with output data 128 generated by second subsystem 108*b* in response to processing data 126. In such embodiments, machine learning algorithm 142 may be configured to resolve the discrepancy between the set of expected metadata fields 116 and the set of received metadata fields 118 in part by modifying mapping 122 such that it becomes a mapping between metadata fields 118 and metadata fields 120, rather than a mapping between metadata fields 116 and metadata fields 120.

Machine learning algorithm 142 includes any algorithms configured to perform the above functions. Machine learning algorithm 142 may correspond to a single algorithm or multiple algorithms. For example metadata tool 102 may use one or more first algorithms of machine learning algorithm 142 to identify metadata discrepancies and one or more second algorithms to resolve the identified metadata discrepancies, where the first algorithms may be different from the second algorithms. Machine learning algorithm 142 may include natural language processing algorithms, neural networks, and/or any other suitable type of machine learning algorithms. Further details of the manner by which metadata tool 102 uses machine learning algorithm 142 to identify and resolve discrepancies between the set of expected metadata fields 118 and the set of received metadata fields 116 are presented below, in the discussion of FIG. 3.

Modifications, additions, or omissions may be made to the systems described herein without departing from the scope of the invention. For example, system 100 may include any number of users 104, devices 106, subsystems 108*a* through 108*d*, networks 132, and central repositories 134. The components may be integrated or separated. Moreover, the operations may be performed by more, fewer, or other components. Additionally, the operations may be performed using any suitable logic comprising software, hardware, and/or other logic.

II. Example Metadata Field Discrepancies

Figure 2A:
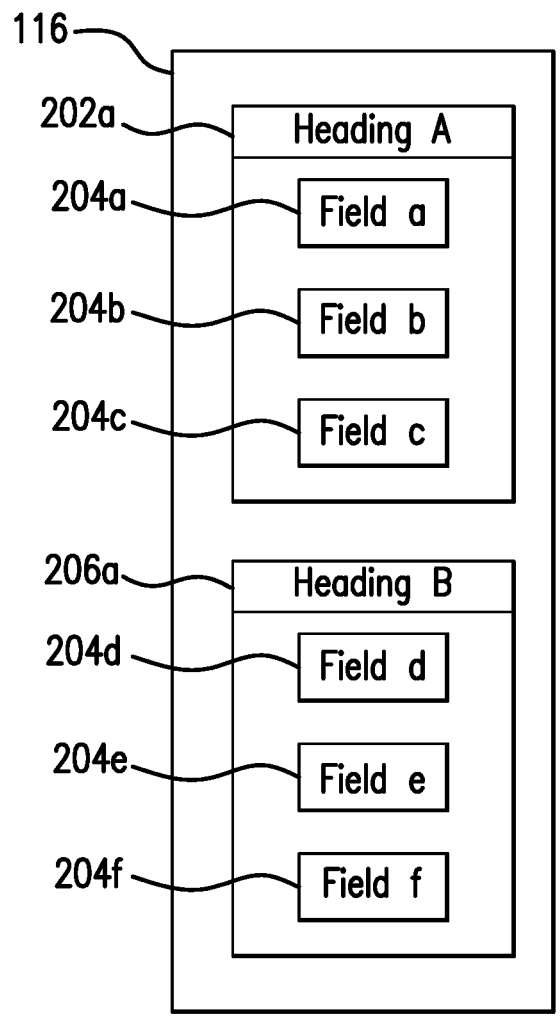
FIGS. 2A and 2B illustrate examples of discrepancies between a first set of metadata fields and a second set of metadata fields.
Figure 2B:
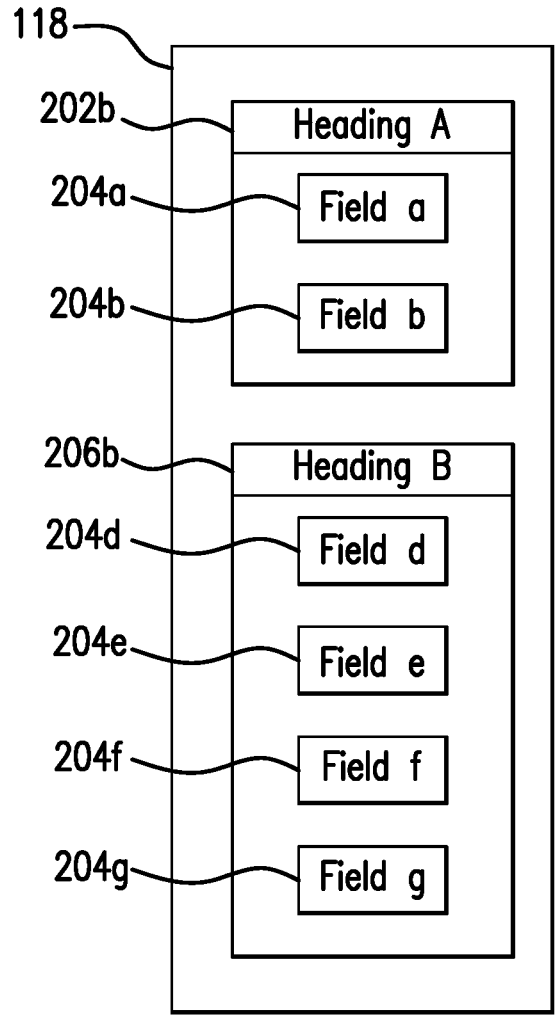

FIGS. 2A and 2B present examples of discrepancies between two sets of metadata fields. FIG. 2A presents an example of a set of metadata fields 116 associated with data 126 that has been transmitted by first subsystem 108*a* to second subsystem 108*b*, and FIG. 2B presents an example of a set of metadata fields 118 that second subsystem 108*b* expects for data 126 received from first subsystem 108*a*.

As is illustrated in FIG. 2A, first set of metadata fields 116 includes three metadata fields 204*a* through 204*c* stored under a first heading 202*a*, and three metadata fields 204*d* through 204*f* stored under a second heading 206*a*. As a specific example, first heading 202*a* may correspond to "creation information," and metadata fields 204*a* through 204*c* may correspond to the fields "author," "date," and "location," configured to store metadata describing the author of data 126, the date data 126 was created, and the location at which data 126 was created, respectively. Second heading 206*a* may correspond to "column information," and metadata fields 204*d* through 204*f* may be configured to store the names of the data columns present in data 126. Similarly, as is illustrated in FIG. 2B, second set of metadata fields 118 includes two metadata fields 204*a* and 204*b* stored under a first heading 202*b*, and four metadata fields 204*d* through 204*g* stored under a second heading 206*b*. In certain embodiments, first heading 202*b* is the same as first heading 202*a* and second heading 206*b* is the same as second heading 206*a*. In some embodiments, first heading 202*b* may correspond to a related but somewhat different name from first heading 202*a*, and/or second heading 206*b* may correspond to a related but somewhat different name from second heading 206*a*. For example, first heading 202*b* may correspond to "creation info," and second heading 206*b* may correspond to "columns."

As is illustrated in FIGS. 2A and 2B, two discrepancies exist between set of metadata fields 116 and set of metadata fields 118: (1) set of metadata fields 116 includes metadata field 204*c*, which is not present in set of metadata fields 118; and (2) set of metadata fields 118 includes metadata field 204*g*, which is not present in set of metadata fields 116. The manner by which metadata tool 102 identifies and resolves these discrepancies is described in further detail below, in the discussion of FIG. 3.

While FIGS. 2A and 2B illustrate an example in which metadata fields 204 are grouped under headings 202 and 206, metadata fields may be stored in any suitable manner. For example, in certain embodiments, rather than grouping metadata fields 204*a* through 204*c* under first heading 202*a* and metadata fields 204*d* through 204*f* under second heading 206*a*, as illustrated in FIG. 2A, metadata fields 204*a* through 204*c* may be stored with a first prefix attached the metadata field names and metadata fields 204*d* through 204*f* may be stored with a second prefix attached to the metadata field names.

III. Metadata Mismatch Identification and Resolution

Figure 3:
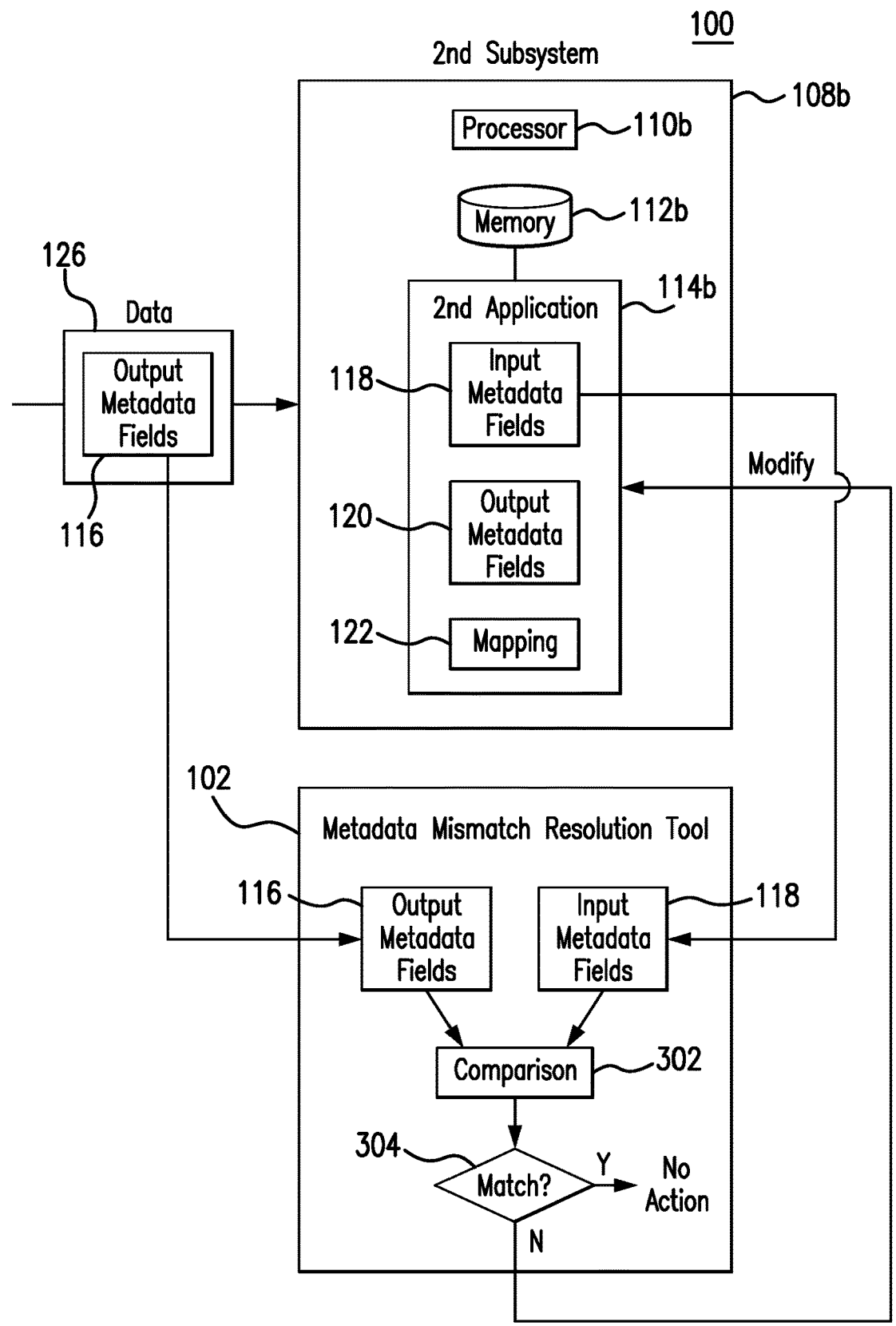
FIG. 3 illustrates an example of the process through which the metadata discrepancy resolution tool of the system of FIG. 1 identifies and resolves a metadata discrepancy.

FIG. 3 illustrates an example of the process by which metadata tool 102 identifies and resolves discrepancies between the set of metadata fields 116 associated with data 126 transmitted from first subsystem 108*a* to second subsystem 108*b*, and the set of metadata fields 118 expected by second subsystem 108*b* for data 126.

a. Identification of Metadata Field Discrepancies

As illustrated in FIG. 3, in response to determining that first subsystem 108*a* has transmitted data 126 to second subsystem 108*b*, metadata tool 102 (1) extracts set of metadata fields 116 from data 126, (2) extracts set of metadata fields 118 from memory 112*b* of second subsystem 108*b*, and (3) performs comparison 302 between set of metadata fields 116 and set of metadata fields 118 to determine whether or not the two sets match. Metadata tool 102 may perform these steps in any suitable manner. For example, in certain embodiments, metadata tool 102 uses machine learning algorithm 142 to extract sets of metadata fields 116 and 118 and/or perform comparison 302 between the two sets of metadata fields. Machine learning algorithm 142 may include any algorithm(s) trained to perform the above functions. For example, in certain embodiments, machine learning algorithm 142 includes one or more natural language processing algorithms, one or more deep learning algorithms (e.g. neural networks), and/or any other appropriate machine learning algorithms.

Metadata fields 116 are stored in data 126. Accordingly, in certain embodiments, machine learning algorithm 142 includes an algorithm configured to parse the metadata of data 126 and to extract the set of metadata fields 116. In contrast to metadata fields 116, which are stored in data 126, metadata fields 118 may be stored in any suitable location of memory 112*b* of second subsystem 108*b*. For example, in certain embodiments, metadata fields 118 may be stored in memory 112*b* in a file, which is accessed by second application 114*b* when second application 114*b* is executed to process data 126. In such embodiments, machine learning algorithm 142 may be configured to identify the file storing metadata fields 118 and parse the contents of this file to extract metadata fields 118. In some embodiments, metadata fields 118 may be hardcoded within the source code of second application 114*b*. In such embodiments, machine learning algorithm 142 may be configured to parse the source code of second application 114*b* and to identify and extract metadata fields 118. For example, in certain embodiments, machine learning algorithm 142 may include a neural network configured to identify and extract metadata fields 118 from the source code of second application 114*b*.

Machine learning algorithm 142 may perform comparison 302 between the set of metadata fields 116 and the set of metadata fields 118 in any suitable manner. For example, in certain embodiments, machine learning algorithm 142 compares the headers 202/206 and/or the names of the metadata fields 204*a* through 204*g* to identify any discrepancies. As a specific example, consider the example set of metadata fields 116 presented in FIG. 2A and the example set of metadata fields 118 presented in FIG. 2B. Machine learning algorithm 142 may first compare headers 202*b* and 206*b* with headers 202*a* and 206*a* to determine that header 202*b* corresponds to (e.g. matches) header 202*a* and header 206*b* corresponds to (e.g. matches) header 206*a*. For example, machine learning algorithm 142 may determine that header 202*b* corresponds to header 202*a* by determining that a cosine similarity index calculated between the name of header 202*b* and the name of header 202*a* is greater than a given threshold. In response to determining that header 202*b* in set of metadata fields 118 corresponds to header 202*a* in set of metadata fields 116, machine learning algorithm 142 may compare the metadata fields 204*a* and 204*b* stored under header 202*b* to the metadata fields 204*a* through 204*c* stored under header 202*a* to determine that set of metadata fields 118 is missing metadata field 204*c*. Similarly, in response to determining that header 206*b* in set of metadata fields 118 corresponds to header 206*a* in set of metadata fields 116, machine learning algorithm 142 may compare the metadata fields 204*d* through 204*g* stored under header 206*b* to the metadata fields 204*d* through 204*f* stored under header 206*a* to determine that set of metadata fields 118 includes the extra metadata field 204*g*, which is not present in set of metadata fields 116.

In certain embodiments, if metadata tool 102 determines at step 304 that no discrepancies exist between set of metadata fields 116 and set of metadata fields 118, it does not take any action. On the other hand, if metadata tool 102 determines at step 304 that (1) one or more metadata fields of the set of metadata fields 116 is not present in the set of metadata fields 118; and/or (2) one or more metadata fields of the set of metadata fields 118 is not present in the set of metadata fields 116, metadata tool 102 prevents subsystem 108*b* from processing data 126. For example, metadata tool 102 may send a message 146 to subsystem 108*b* instructing subsystem 108*b* to refrain from processing data 126.

b. Resolution of Metadata Field Discrepancies

In response to determining at step 304 that a discrepancy exists between set of metadata fields 116 and set of metadata fields 118, metadata tool 102 next resolves this discrepancy. In certain embodiments, metadata tool 102 implements machine learning algorithm 142 to resolve the discrepancy.

Machine learning algorithm 142 may be configured to resolve a discrepancy between the metadata fields 118 expected for data 126 and the metadata fields 116 received for data 126 in any suitable manner. As an example, in certain embodiments, in response to determining that the set of received metadata fields 116 includes one or more extra metadata fields that are not present in the set of expected metadata fields 118, machine learning algorithm 142 is configured to add these extra metadata fields to the set of expected metadata fields 118. In particular, machine learning algorithm 142 may be configured to identify the location(s) of the extra metadata field(s) within the set of received metadata fields 116 and add the extra metadata field(s) to the set of expected metadata fields 118 at corresponding locations within the set of expected metadata fields 118. For example, consider the example set of metadata fields 116 presented in FIG. 2A and the example set of metadata fields 118 presented in FIG. 2B. In response to determining that set of metadata fields 116 includes an extra metadata field 204*c* under header 202*a*, as compared to set of metadata fields 118, machine learning algorithm 142 may add metadata field 204*c* under corresponding header 202*b* of set of metadata fields 118.

In certain embodiments, in addition to storing expected metadata fields 118, memory 112*b* of second subsystem 108*b* also stores a mapping 122 between expected metadata fields 118 and output metadata fields 120, where output metadata fields 120 correspond to the metadata fields associated with output data 128 that is generated by second subsystem 108*b* in response to processing data 126. In such embodiments, machine learning algorithm 142 may be configured to further resolve the discrepancy between expected metadata fields 118 and received metadata fields 116 by modifying mapping 122, such that mapping 122 becomes a mapping between received metadata fields 116 and output metadata fields 120. As an example, consider a situation in which metadata fields 118 indicate that application 114*b* expects to receive data 126 that includes 3 columns of information. Application 114*b* may be configured to generate output data 128 that includes the same information as data 126, but with a different formatting. For example, application 114b may be configured to convert from comma-delimited values to tab-delimited values. Mapping 122 will therefore be a one-to-one mapping between the set of expected metadata fields 118 and the set of output metadata fields 120 of output data 128, with the set of output metadata fields 120 indicating that output data 128 also includes 3 columns of information. Accordingly, if the set of received metadata fields 116 indicates that data 126 actually includes four columns of information, mapping 122 should be updated such that output data 128 also includes four columns and the set of output metadata fields 120 indicates that output data 128 includes four columns. Machine learning algorithm 142 may be configured to modify mapping 122 in any suitable way. For example, in certain embodiments, machine learning algorithm 142 includes one or more deep learning algorithms configured to identify mapping 122 within memory 112b (e.g., within the computer readable instructions associated with second application 114b) and modify mapping 122 such that it corresponds to a mapping from the set of received metadata fields 116 to the set of output metadata fields 120.

In response to resolving the discrepancy between the set of received metadata fields 116 and the set of expected metadata fields 118, metadata tool 102 allows second subsystem 108b to process data 126. For example, in certain embodiments, metadata tool 102 sends a message 146 to second subsystem 108b instructing second subsystem 108b to process data 126.

In certain embodiments, in response to resolving the discrepancy between the set of received metadata fields 116 and the set of expected metadata fields 118, metadata tool 102 may determine that prior to resolving the discrepancy second subsystem 108b improperly processed an earlier piece of data 126 received from first subsystem 108a. Accordingly, metadata tool 102 may cause second subsystem 108b to reprocess this earlier data 126. For example, metadata tool 102 may instruct first subsystem 108a to retransmit this earlier data 126 to second subsystem 108b.

In certain embodiments, in response to resolving the discrepancy between the set of received metadata fields 116 and the set of expected metadata fields 118, metadata tool 102 may store a copy of set of metadata fields 116 in central repository 134. In this manner, a fourth subsystem configured to process data received from first subsystem 108a and/or transmit data to second subsystem 108b, which does not have a hardcoded set of metadata fields 116 stored in memory 112d, but rather obtains these fields from central repository 134, may obtain knowledge of the current form of set of metadata fields 116 produced by first subsystem 108a and/or expected by second subsystem 108b. For example, in response to resolving the discrepancy between the set of received metadata fields 116 and the set of expected metadata fields 118, metadata tool 102 may store a copy of set of metadata fields 116 in central repository 134 as set of metadata fields 136a. In response to receiving data 148 from first subsystem 108a, fourth subsystem 108d may then access central repository 134 to obtain set of metadata fields 136a, which fourth subsystem 108d may use to process data 148.

IV. Method of Identifying and Resolving Metadata Discrepancies

Figure 4:
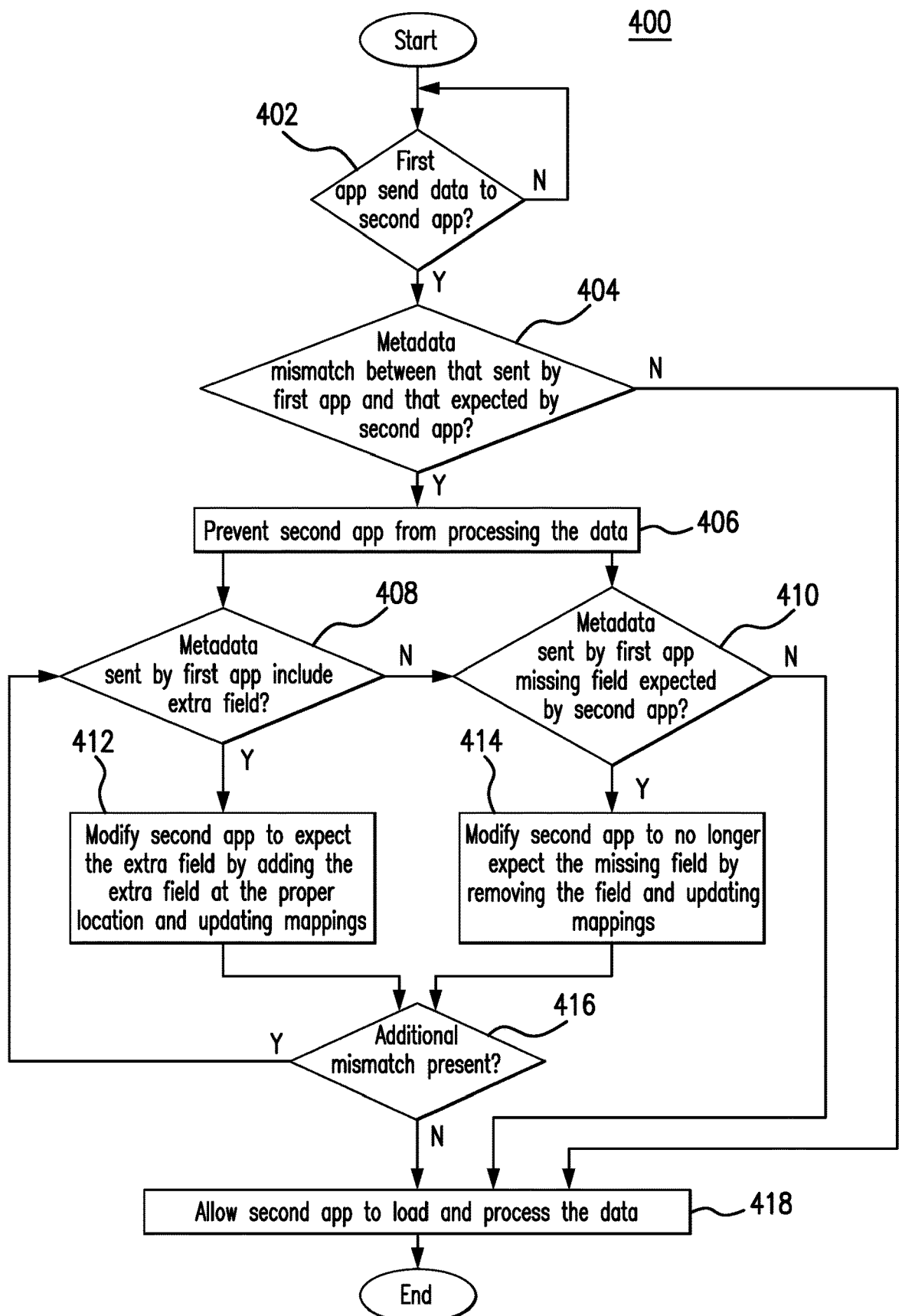
FIG. 4 presents a flowchart illustrating an example method through which the metadata discrepancy resolution tool of the system of FIG. 1 determines that a metadata discrepancy exists and resolves the discrepancy.

FIG. 4 presents a flowchart illustrating an example method 400 by which metadata tool 102 identifies a discrepancy between the set of received metadata fields 116 and the set of expected metadata fields 118. In step 402 metadata tool 102 determines whether first subsystem 108a transmitted data 126 to second subsystem 108b. For example, metadata tool 102 may determine whether first application 114a of first subsystem 108a transmitted data 126 to second application 114b of second subsystem 108b. If, in step 402 metadata tool 102 determines that first subsystem 108a did not transmit data 126 to second subsystem 108b, metadata tool 102 continues to monitor for data transmission.

If, in step 402 metadata tool 102 determines that first subsystem 108a transmitted data 126 to second subsystem 108b, in step 404 metadata tool 102 determines whether there is a discrepancy between the set of received metadata fields 116, associated with data 126, and the set of metadata fields 118 expected by second subsystem 108b for data 126. For example, metadata tool 102 may determine that (1) a metadata field 204 of the set of received metadata fields 116 is not present in the set of expected metadata fields 118, and/or (2) a metadata fields 204 of the set of expected metadata fields 118 is not present in the set of received metadata fields 116. Metadata tool 102 may determine whether there is a discrepancy between the set of received metadata fields 116 and the set of expected metadata fields 118 in any suitable manner. For example, in certain embodiments, metadata tool 102 may implement machine learning algorithm 142 to extract and compare the set of expected metadata fields 118 with the set of received metadata fields 116 to determine whether a discrepancy exists.

If, in step 404 metadata tool 102 determines that the set of received metadata fields 116 matches the set of expected metadata fields 118, in step 418 metadata tool 102 allows second subsystem 108b to process data 126. For example, in certain embodiments, metadata tool 102 does not interact with second subsystem 108b. If, in step 404 metadata tool 102 determines that a discrepancy exists between the set of received metadata fields 116 and the set of expected metadata fields 118, in step 406 metadata tool 102 prevents second subsystem 108b from processing data 126. For example, metadata tool 102 may prevent second application 114b installed on second subsystem 108b from processing data 126. For instance, metadata tool 102 may send message 146 to second application 114b instructing second application 114b to refrain from processing data 126.

In step 408 metadata tool 102 determines whether the set of received metadata fields 116 includes an extra metadata field 204 that is not present in the set of expected metadata fields 118. If, in step 408 metadata tool 102 determines that the set of received metadata fields 116 includes an extra metadata field 204, in step 412 metadata tool 102 resolves this discrepancy by modifying second subsystem 108b such that second subsystem 108b expects to receive set of metadata fields 116 rather than set of metadata fields 118. For example, in certain embodiments, metadata tool 102 modifies computer readable instructions corresponding to second application 114b and stored in memory 112b, such that second application 114b expects to receive set of metadata fields 116 rather than set of metadata fields 118. As an example, in certain embodiments, metadata tool 102 adds the extra metadata field 204 to the set of expected metadata fields 118 at a location in set of expected metadata fields 118 corresponding to the location of the extra metadata field 204 in the set of received metadata fields 116. In certain embodiments, modifying second application 114b includes modifying mapping 122 between set of expected metadata fields 118 and set of output metadata fields 120 to be a mapping between set of metadata fields 116 and set of output metadata fields 120, where set of output metadata fields 120 correspond to the metadata fields expected by third subsystem 108c, which receives output data 128 from second subsystem 108b.

If, in step 408 metadata tool 102 determines that the set of received metadata fields 116 does not include an extra metadata field 204, in step 410 metadata tool 102 determines whether the set of received metadata fields 116 is missing a metadata field 204 expected by second subsystem 108b. If, in step 410 metadata tool 102 determines that the set of received metadata fields 116 is missing a metadata field 204, in step 414 metadata tool 102 resolves this discrepancy by modifying second subsystem 108b such that second subsystem 108b expects to receive set of metadata fields 116 rather than set of metadata fields 118. For example, in certain embodiments, metadata tool 102 modifies the computer readable instructions corresponding to second application 114b and stored in memory 112b, such that second application 114b expects to receive set of metadata fields 116 rather than set of metadata fields 118. As an example, in certain embodiments, metadata tool 102 removes the metadata field 204 from the set of expected metadata fields 118. In certain embodiments, modifying second application 114b includes modifying mapping 122 between set of expected metadata fields 118 and set of output metadata fields 120 to be a mapping between set of metadata fields 116 and set of output metadata fields 120, where set of output metadata fields 120 correspond to the metadata fields expected by third subsystem 108c, which receives output data 128 from second subsystem 108b.

If, in step 410 metadata tool 102 determines that the set of received metadata fields 116 is not missing a metadata field 204 expected by second subsystem 108b, in step 416 metadata tool 102 determines whether any additional discrepancies exist between set of expected metadata fields 118 and set of received metadata fields 116. If, in step 416 metadata tool 102 determines that additional discrepancies exist, method 400 returns to step 408. If, in step 416 metadata tool 102 determines that no additional discrepancies exist, in step 418 metadata tool 102 allows second subsystem 108b to load and process data 126. For example, in certain embodiments, metadata tool 102 transmits a message 146 to second subsystem 108b instructing second subsystem 108b to load and/or process data 126. In some embodiments, metadata tool 102 metadata tool 102 restarts the job that gave rise to the transmission of data 126 to second subsystem 108b.

While illustrated in FIG. 4 as involving a first application 114a of a first subsystem 108a and a second application 114b of a second subsystem 108b, method 400 may apply to any number of applications 114 and/or subsystems 108. For example, metadata tool 102 may modify the expected metadata fields and associated mappings of any applications 114 in any subsystems 108 that are affected by a change in/update to the metadata fields 116 of data 126.

Modifications, additions, or omissions may be made to method 400 depicted in FIG. 4. Method 400 may include more, fewer, or other steps. For example, steps may be performed in parallel or in any suitable order. While discussed as metadata tool 102 (or components thereof) performing the steps, any suitable component of system 100, such as device(s) 106 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A system comprising:
a first subsystem comprising:
   a first memory configured to store first instructions of a first application; and
   a first hardware processor, communicatively coupled to the first memory, the first hardware processor configured to:
      generate, using the first instruction of the first application, a set of first data comprising a set of elements of first metadata associated with a set of first metadata fields, each element of first metadata of the set of elements of first metadata stored in a respective metadata field of the set of first metadata fields; and
      transmit the set of first data to a second subsystem;
the second subsystem comprising:
   a second memory configured to store second instructions of a second application and a set of expected metadata fields, the second application being configured to process the set of first data using the set of expected metadata fields; and
   a second hardware processor, communicatively coupled to the second memory, the second hardware processor configured to receive the set of first data; and
a third hardware processor configured to:
   determine that the first subsystem transmitted the set of first data to the second subsystem;
   determine that a mismatch exists between the set of first metadata fields and the set of expected metadata fields, wherein the mismatch comprises at least one of:
      a metadata field of the set of first metadata fields is missing from the set of expected metadata fields; and
      a metadata field of the set of expected metadata fields is missing from the set of first metadata fields; and
   in response to determining that the mismatch exists:
      prevent the second subsystem from executing the second instructions of the second application;
      resolve the mismatch by modifying the set of expected metadata fields, such that the modified set of expected metadata fields corresponds to the set of first metadata fields; and
      allow the second subsystem to execute the second instructions of the second application, wherein the second application, when executed by the second subsystem:
         processes the set of first data using the modified set of expected metadata fields; and
         generates a set of second data comprising a set of elements of second metadata associated with a set of second metadata fields, wherein the set of second metadata fields is different from the set of first metadata fields.

2. The system of claim 1, wherein:
the metadata field of the set of first metadata fields is missing from the set of expected metadata fields;
the metadata field of the set of first metadata fields that is missing from the set of expected metadata fields is stored in the set of first metadata fields under a first heading;

each metadata field of the set of expected metadata fields is stored under a heading of a set of headings; and
adding the metadata field of the set of first metadata fields that is missing from the set of expected metadata fields comprises:
identifying a heading of the set of headings that corresponds to the first heading; and
adding the metadata field of the set of first metadata fields that is missing from the set of expected metadata fields to the set of expected metadata fields under the heading of the set of headings that corresponds to the first heading.

3. The system of claim 1, wherein:
the second memory further comprises a mapping between the set of expected metadata fields and the set of second metadata fields; and
the third hardware processor is further configured to modify the mapping, such that the mapping is between the set of first metadata fields and the set of second metadata fields.

4. The system of claim 1, wherein:
the first hardware processor is further configured to:
generate, using the first instructions of the first application, a second set of first data comprising a second set of elements of first metadata associated with a second set of first metadata fields, each element of first metadata of the second set of elements of first metadata stored in a respective metadata field of the second set of first metadata fields; and
transmit the second set of first data to the second subsystem; and
the third hardware processor is further configured to:
determine that the first subsystem transmitted the second set of first data to the second subsystem;
determine that a mismatch does not exist between the second set of first metadata fields and the set of expected metadata fields; and
in response to determining that the mismatch does not exist between the second set of first metadata fields and the set of expected metadata fields, decline to prevent the second subsystem from executing the second instructions of the second application, wherein the second application is further configured to process the second set of first data using the set of expected metadata fields.

5. The system of claim 1, further comprising a database, wherein in response to determining that the mismatch exists, the third hardware processor is further configured to store the set of first metadata fields in the database.

6. The system of claim 5, further comprising a third subsystem, wherein:
the first hardware processor is further configured to transmit the set of first data to the third subsystem; and
the third subsystem is configured to:
retrieve the set of first metadata fields from the database; and
in response to retrieving the set of first metadata fields from the database, process the set of first data.

7. The system of claim 1, wherein determining that the mismatch exists comprises applying a machine learning algorithm to the set of first metadata fields, the machine learning algorithm configured to determine that the mismatch exists based in part on a comparison of the set of first metadata fields to the set of expected metadata fields.

8. A method comprising:
determining that a first subsystem transmitted a set of first data to a second subsystem, the set of first data comprising a set of elements of first metadata associated with a set of first metadata fields, each element of first metadata of the set of elements of first metadata stored in a respective metadata field of the set of first metadata fields, wherein:
the set of first data was generated by a first application of the first subsystem; and
determining that a mismatch exists between the set of first metadata fields and a set of expected metadata fields expected by the second subsystem, wherein the mismatch comprises at least one of:
a metadata field of the set of first metadata fields is missing from the set of expected metadata fields; and
a metadata field of the set of expected metadata fields is missing from the set of first metadata fields; and
in response to determining that the mismatch exists:
preventing the second subsystem from executing a second application of the second subsystem configured to process the set of first data using the set of expected metadata fields;
resolving the mismatch by modifying the set of expected metadata fields, such that the modified set of expected metadata fields corresponds to the set of first metadata fields; and
allowing the second subsystem to execute the second application, wherein the second application, when executed by the second subsystem:
processes the set of first data using the modified set of expected metadata fields; and
generates a set of second data comprising a set of elements of second metadata associated with a set of second metadata fields, wherein the set of second metadata fields is different from the set of first metadata fields.

9. The method of claim 8, wherein:
the metadata field of the set of first metadata fields is missing from the set of expected metadata fields;
the metadata field of the set of first metadata fields that is missing from the set of expected metadata fields is stored in the set of first metadata fields under a first heading;
each metadata field of the set of expected metadata fields is stored under a heading of a set of headings; and
adding the metadata field of the set of first metadata fields that is missing from the set of expected metadata fields comprises:
identifying a heading of the set of headings that corresponds to the first heading; and
adding the metadata field of the set of first metadata fields that is missing from the set of expected metadata fields to the set of expected metadata fields under the heading of the set of headings that corresponds to the first heading.

10. The method of claim 8, wherein:
the second application is further configured to use a mapping between the set of expected metadata fields and the set of second metadata fields to process the set of first data; and
the method further comprises modifying the mapping, such that the mapping is between the set of first metadata fields and the set of second metadata fields.

11. The method of claim 8, further comprising:
determining that the first subsystem transmitted a second set of first data to the second subsystem, the second set of first data comprising a second set of elements of first metadata associated with a second set of first metadata fields, each element of first metadata of the second set of elements of first metadata stored in a respective metadata field of the second set of first metadata fields, wherein the second set of first data was generated by the first application of the first subsystem;

determining that a mismatch does not exist between the second set of first metadata fields and the set of expected metadata fields; and in response to determining that the mismatch does not exist between the second set of first metadata fields and the set of expected metadata fields, declining to prevent the second subsystem from executing the second application, wherein the second application is further configured to process the second set of first data using the set of expected metadata fields.

12. The method of claim 8, further comprising, in response to determining that the mismatch exists, storing the set of first metadata fields in a database, wherein a third subsystem is configured to retrieve the set of first metadata fields from the database.

13. The method of claim 8, wherein determining that the mismatch exists comprises applying a machine learning algorithm to the set of first metadata fields, the machine learning algorithm configured to determine that the mismatch exists based in part on a comparison of the set of first metadata fields to the set of expected metadata fields.

14. A system comprising:
a first subsystem comprising:
  a first memory configured to store:
    non-transitory computer readable instructions corresponding to a first application configured, when implemented by a first hardware processor to:
      generate a set of first data comprising a set of elements of first metadata associated with a set of first metadata fields, each element of first metadata of the set of elements of first metadata stored in a respective metadata field of the set of first metadata fields; and
  the first hardware processor, communicatively coupled to the first memory, the first hardware processor configured to:
    implement the non-transitory computer readable instructions corresponding to the first application to generate the set of first data; and
    transmit the set of first data to a second subsystem;
the second subsystem comprising:
  a second memory configured to store:
    non-transitory computer readable instructions corresponding to a second application comprising a set of expected metadata fields, and configured, when implemented by a second hardware processor, to process a set of expected data, wherein:
      the set of expected data comprises a set of elements of expected metadata associated with the set of expected metadata fields, wherein each element of expected metadata of the set of elements of expected metadata is stored in a respective expected metadata field of the set of expected metadata fields; and
  the second hardware processor, communicatively coupled to the second memory, the second hardware processor configured to:
    receive the set of first data; and
    implement the non-transitory computer readable instructions corresponding to the second application to process the set of first data; and
a third hardware processor configured to:
  determine that the first subsystem transmitted the set of first data to the second subsystem;
  determine that a mismatch exists between the set of first metadata fields and the set of expected metadata fields, wherein the mismatch comprises at least one of:
    a metadata field of the set of first metadata fields is missing from the set of expected metadata fields; and
    a metadata field of the set of expected metadata fields is missing from the set of first metadata fields; and
  in response to determining that the mismatch exists:
    prevent the second subsystem from implementing the non-transitory computer readable instructions corresponding to the second application to process the set of first data;
    resolve the mismatch by modifying the non-transitory computer readable instructions corresponding to the second application, such that:
      the modified set of expected metadata fields corresponds to the set of first metadata fields; and
      the non-transitory computer readable instructions corresponding to the second application are configured, when implemented by the second hardware processor, to process the set of first data, wherein modifying the non-transitory computer readable instructions corresponding to the second application comprises at least one of:
        adding the metadata field of the set of first metadata fields that is missing from the set of expected metadata fields to the non-transitory computer readable instructions corresponding to the second application; and
        removing the metadata field of the set of expected metadata fields that is missing from the set of first metadata fields from the non-transitory computer readable instructions corresponding to the second application; and
    instruct the second subsystem to implement the non-transitory computer readable instructions corresponding to the second application to process the set of first data, wherein the second application, when executed by the second subsystem:
      processes the set of first data using the modified set of expected metadata fields; and
      generates a set of second data comprising a set of elements of second metadata associated with a set of second metadata fields, wherein the set of second metadata fields is different from the set of first metadata fields.

15. The system of claim 14, wherein:
the mismatch comprises the metadata field of the set of first metadata fields missing from the set of expected metadata fields;
modifying the non-transitory computer readable instructions corresponding to the second application comprises adding the metadata field of the set of first metadata fields that is missing from the set of expected metadata fields to the non-transitory computer readable instructions corresponding to the second application;
the metadata field of the set of first metadata fields that is missing from the set of expected metadata fields is stored in the set of first metadata fields under a first heading;
each metadata field of the set of expected metadata fields is stored under a heading of a set of headings; and adding the metadata field of the set of first metadata fields that is missing from the set of expected metadata fields comprises:
- identifying a heading of the set of headings that corresponds to the first heading; and
- adding the metadata field of the set of first metadata fields that is missing from the set of expected metadata fields to the set of expected metadata fields of the non-transitory computer readable instructions corresponding to the second application under the heading of the set of headings that corresponds to the first heading.

16. The system of claim 14, wherein:
the non-transitory computer readable instructions corresponding to the second application further comprise a mapping from the set of expected metadata fields to a set of third metadata fields;
the non-transitory computer readable instructions corresponding to the second application are further configured, when implemented by the second hardware processor, to process the set of second data to generate a set of third data, wherein the set of third data comprises a set of elements of third metadata associated with the set of third metadata fields, each element of third metadata of the set of elements of third metadata stored in a third metadata field of the set of third metadata fields; and
modifying the non-transitory computer readable instructions corresponding to the second application to resolve the mismatch further comprises modifying the mapping.

17. The system of claim 14, wherein:
the non-transitory computer readable instructions corresponding to the first application are further configured, when implemented by the first hardware processor, to generate a second set of first data comprising a second set of elements of first metadata associated with a second set of first metadata fields, each element of first metadata of the second set of elements of first metadata stored in a metadata field of the second set of first metadata fields;
the first hardware processor is further configured to implement the non-transitory computer readable instructions corresponding to the first application to generate the second set of first data; and
the third hardware processor is further configured to:
- determine that the first subsystem transmitted the second set of first data to the second subsystem;
- determine that a mismatch does not exist between the second set of first metadata fields and the set of expected metadata fields; and
- in response to determining that the mismatch does not exist between the second set of first metadata fields and the set of expected metadata fields, decline to prevent the second subsystem from implementing the non-transitory computer readable instructions corresponding to the second application to process the second set of first data, wherein the non-transitory computer readable instructions corresponding to the second application are further configured, when implemented by the second hardware processor, to process the second set of first data.

18. The system of claim 14, further comprising a database, wherein in response to determining that the mismatch exists, the third hardware processor is further configured to store the set of first metadata fields in the database.

19. The system of claim 18, further comprising a third subsystem, wherein:
the first hardware processor is further configured to transmit the set of first data to the third subsystem; and
the third subsystem is configured to:
- retrieve the set of first metadata fields from the database; and
- in response to retrieving the set of first metadata fields from the database, process the set of first data.

20. The system of claim 14, wherein determining that the mismatch exists comprises applying a machine learning algorithm to the set of first metadata fields, the machine learning algorithm configured to determine that the mismatch exists based in part on a comparison of the set of first metadata fields to the set of expected metadata fields.

* * * * *